(12) United States Patent
Mikawa

(10) Patent No.: US 10,547,144 B2
(45) Date of Patent: Jan. 28, 2020

(54) CARD CONNECTOR

(71) Applicant: JAPAN AVIATION ELECTRONICS INDUSTRY, LIMITED, Shibuya-ku, Tokyo (JP)

(72) Inventor: Kazuya Mikawa, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 16/380,172

(22) Filed: Apr. 10, 2019

(65) Prior Publication Data

US 2019/0363489 A1 Nov. 28, 2019

(30) Foreign Application Priority Data

May 22, 2018 (JP) ................................. 2018-098151

(51) Int. Cl.
*H01R 13/635* (2006.01)
*H01R 12/71* (2011.01)
*G06K 13/08* (2006.01)

(52) U.S. Cl.
CPC ....... *H01R 13/635* (2013.01); *G06K 13/0831* (2013.01); *H01R 12/712* (2013.01)

(58) Field of Classification Search
CPC .......................... G06K 13/0831; H01R 13/635
See application file for complete search history.

(56) References Cited

U.S. PATENT DOCUMENTS

| | | | |
|---|---|---|---|
| 8,579,640 B2 * | 11/2013 | Ho | H01R 13/6271 439/159 |
| 8,597,058 B2 | 12/2013 | Lin et al. | |
| 2011/0255252 A1 * | 10/2011 | Sloey | H04B 1/3816 361/752 |
| 2016/0036143 A1 * | 2/2016 | Motohashi | G06K 13/08 439/160 |
| 2017/0040742 A1 * | 2/2017 | Hu | H01R 13/635 |
| 2017/0172004 A1 | 6/2017 | Yang et al. | |

(Continued)

FOREIGN PATENT DOCUMENTS

| | | |
|---|---|---|
| JP | 2012146488 A | 8/2012 |
| JP | 2014013674 A | 1/2014 |
| JP | 2015109182 A | 6/2015 |

(Continued)

*Primary Examiner* — Tho D Ta
(74) *Attorney, Agent, or Firm* — Holtz, Holtz & Volek PC

(57) ABSTRACT

A card connector comprises a connector main and a tray. The connector main is configured to receive the tray along a front-rear direction. The connector main is provided with an ejection mechanism for ejecting the tray. The ejection mechanism has at least a push portion which pushes the tray upon ejection of the tray. The tray has a first card accommodation portion, a second card accommodation portion and a mechanism accommodation portion. The mechanism accommodation portion is positioned forward of the first card accommodation portion in the front-rear direction. The mechanism accommodation portion is provided with a pushed portion. The mechanism accommodation portion accommodates at least the push portion under a received state where the tray is received in the connector main. When the push portion pushes the pushed portion, the tray is ejected from the connector main.

12 Claims, 12 Drawing Sheets

(56) References Cited

U.S. PATENT DOCUMENTS

2018/0260588 A1* 9/2018 Shafir .................. H04B 1/3818

FOREIGN PATENT DOCUMENTS

| JP | 2016062854 | A | 4/2016 |
| JP | 5967384 | B2 | 8/2016 |
| JP | 2017107838 | A | 6/2017 |
| JP | 2018010727 | A | 1/2018 |

* cited by examiner

CARD CONNECTOR

CROSS REFERENCE TO RELATED APPLICATIONS

This application is based on and claims priority under 35 U.S.C. § 119 to Japanese Patent Application No. JP2018-098151 filed May 22, 2018, the contents of which are incorporated herein in their entireties by reference.

BACKGROUND OF THE INVENTION

This invention relates to a card connector.

Referring to FIGS. 21 and 22, JP-A 2018-10727 (Patent Document 1) discloses a card connector 900 which comprises a tray 910 and a connector main 950. The connector main 950 is configured to receive the tray 910 along a front-rear direction, or along an X-direction. The connector main 950 is provided with an ejection mechanism 960 for ejecting the tray 910. The ejection mechanism 960 has a push portion 962 which pushes the tray 910 upon ejection of the tray 910. The tray 910 has a first card accommodation portion 912, a second card accommodation portion 914 and a pushed portion 916. The first card accommodation portion 912 is positioned above the second card accommodation portion 914 in an up-down direction, or in a Z-direction, which is perpendicular to the front-rear direction. The pushed portion 916 is positioned at a front end, or a positive X-side end, of the tray 910 in the front-rear direction. When the push portion 962 of the ejection mechanism 960 pushes the pushed portion 916 of the tray 910, the tray 910 is ejected from the connector main 950.

Recently, a card connector, which is included in a smartphone, etc., is required to have a reduced length, or a reduced dimension in a front-rear direction, because the card connector having the reduced length is beneficial for a layout of inner parts of the smartphone therein. One possible approach for reducing a dimension of the card connector 900 in the front-rear direction is to downsize and simplify the ejection mechanism 960 so as to reduce a space which a movement of the ejection mechanism 960 requires. However, if the ejection mechanism 960 is modified to reduce the space which its movement requires, the modified ejection mechanism 960 has a problem of reduced durability.

SUMMARY OF THE INVENTION

It is therefore an object of the present invention to provide a card connector which has a reduced dimension in a front-rear direction without reducing durability of an ejection mechanism for ejecting a tray.

One aspect of the present invention provides a card connector comprising a connector main and a tray. The connector main is configured to receive the tray along a front-rear direction. The connector main is provided with an ejection mechanism for ejecting the tray. The ejection mechanism has at least a push portion which pushes the tray upon ejection of the tray. The tray has a first card accommodation portion, a second card accommodation portion and a mechanism accommodation portion. Each of the first card accommodation portion and the mechanism accommodation portion is positioned above the second card accommodation portion in an up-down direction perpendicular to the front-rear direction. The first card accommodation portion has a front end in the front-rear direction. The second card accommodation portion has a front end in the front-rear direction. The front end of the first card accommodation portion is positioned rearward of the front end of the second card accommodation portion in the front-rear direction. The mechanism accommodation portion is positioned forward of the first card accommodation portion in the front-rear direction. The mechanism accommodation portion is provided with a pushed portion. The mechanism accommodation portion accommodates at least the push portion under a received state where the tray is received in the connector main. When the push portion pushes the pushed portion, the tray is ejected from the connector main.

The tray of the card connector of the present invention has the mechanism accommodation portion which is positioned forward of the first card accommodation portion. In addition, the mechanism accommodation portion accommodates at least the push portion of the ejection mechanism of the connector main under the received state where the tray is received in the connector main of the card connector. Accordingly, the card connector of the present invention can have a reduced dimension in the front-rear direction without reducing durability of the ejection mechanism for ejecting the tray.

An appreciation of the objectives of the present invention and a more complete understanding of its structure may be had by studying the following description of the preferred embodiment and by referring to the accompanying drawings.

Figure 1:
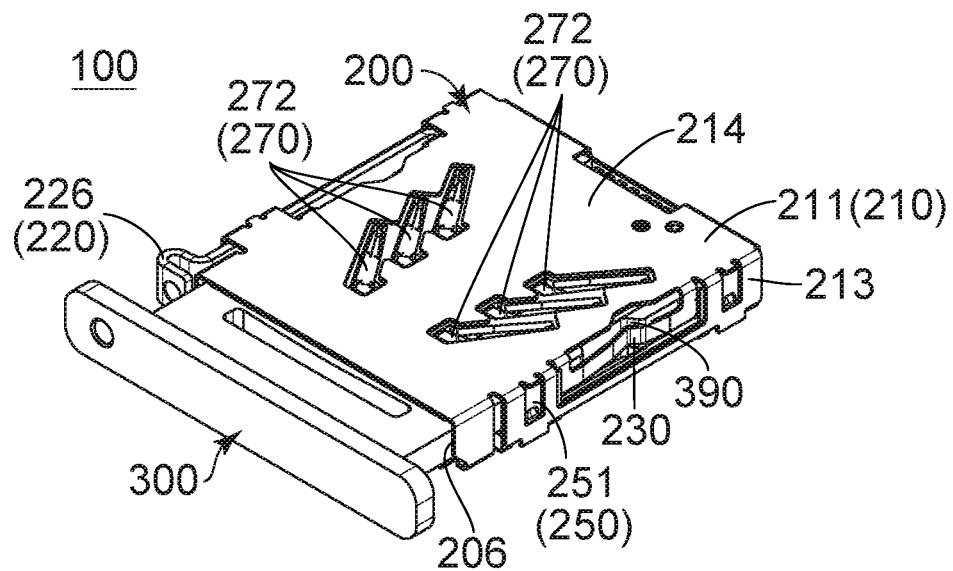
FIG. 1 is a perspective view showing a card connector according to an embodiment of the present invention. In the figure, the card connector is in a received state where a tray is received in a connector main.
Figure 2:
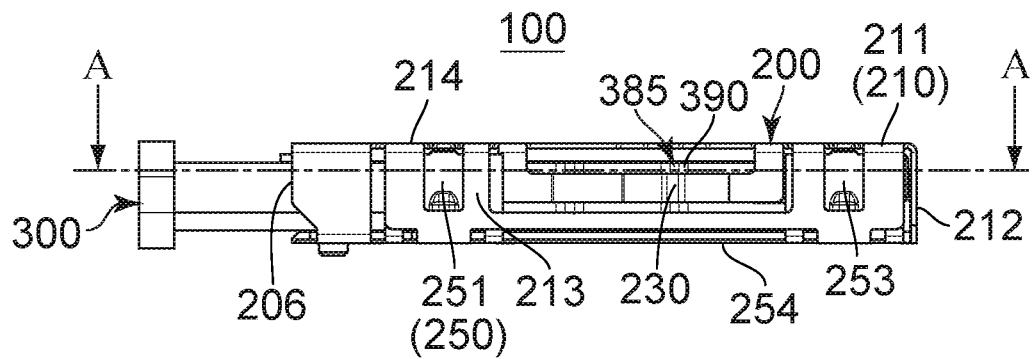
FIG. 2 is a side view showing the card connector of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

As shown in FIG. 1, a card connector 100 according to an embodiment of the present invention comprises a connector main 200 and a tray 300.

Figure 5:
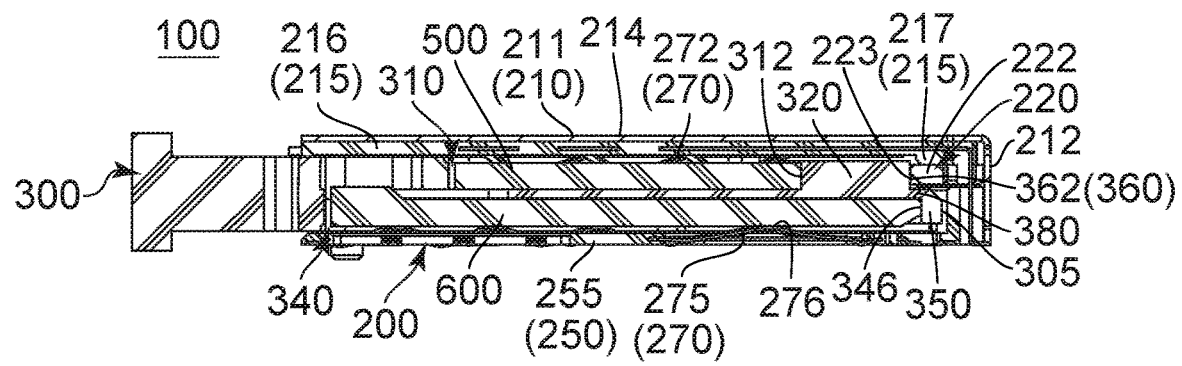
FIG. 5 is a cross-sectional view showing the card connector of FIG. 4, taken along line B-B.

As shown in FIG. 5, the connector main 200 of the present embodiment receives the tray 300 along a front-rear direction. More specifically, the connector main 200 receives the tray 300 through its rear end along the front-rear direction. In the present embodiment, the front-rear direction is an X-direction. Specifically, forward is a positive X-direction, and rearward is a negative X-direction.

Figure 14:
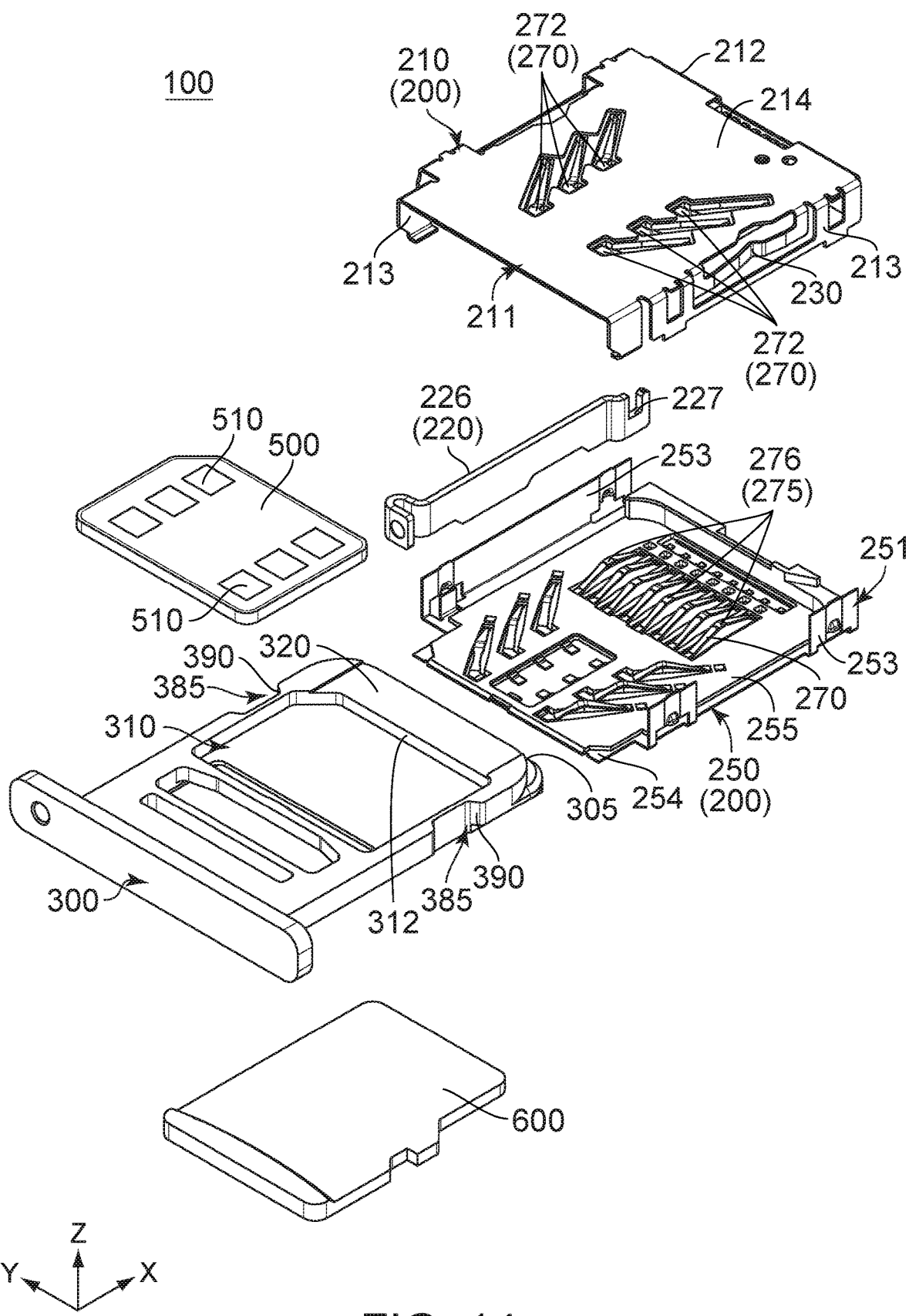
FIG. 14 is an exploded, perspective view showing the card connector of FIG. 1.

As shown in FIG. 14, the connector main 200 of the present embodiment comprises a first member 210, a second member 250 and a plurality of terminals 270.

Figure 12:
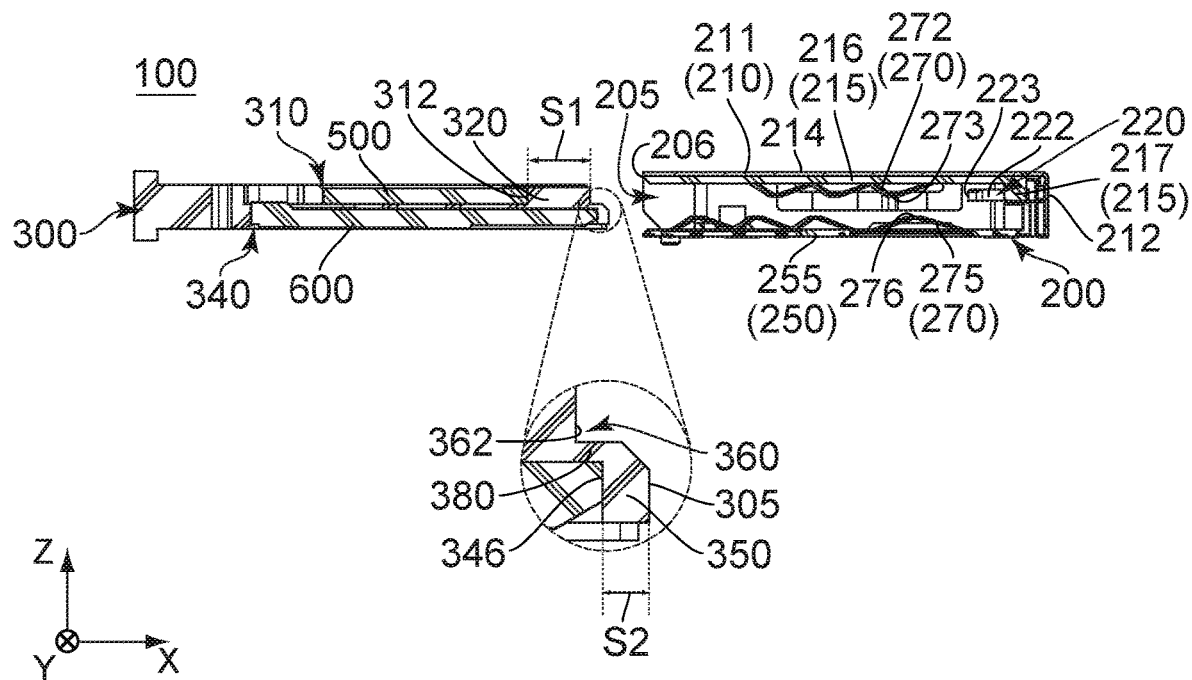
FIG. 12 is a cross-sectional view showing the card connector of FIG. 11, taken along line E-E. In the figure, a part of the tray is illustrated enlarged.
Figure 13:
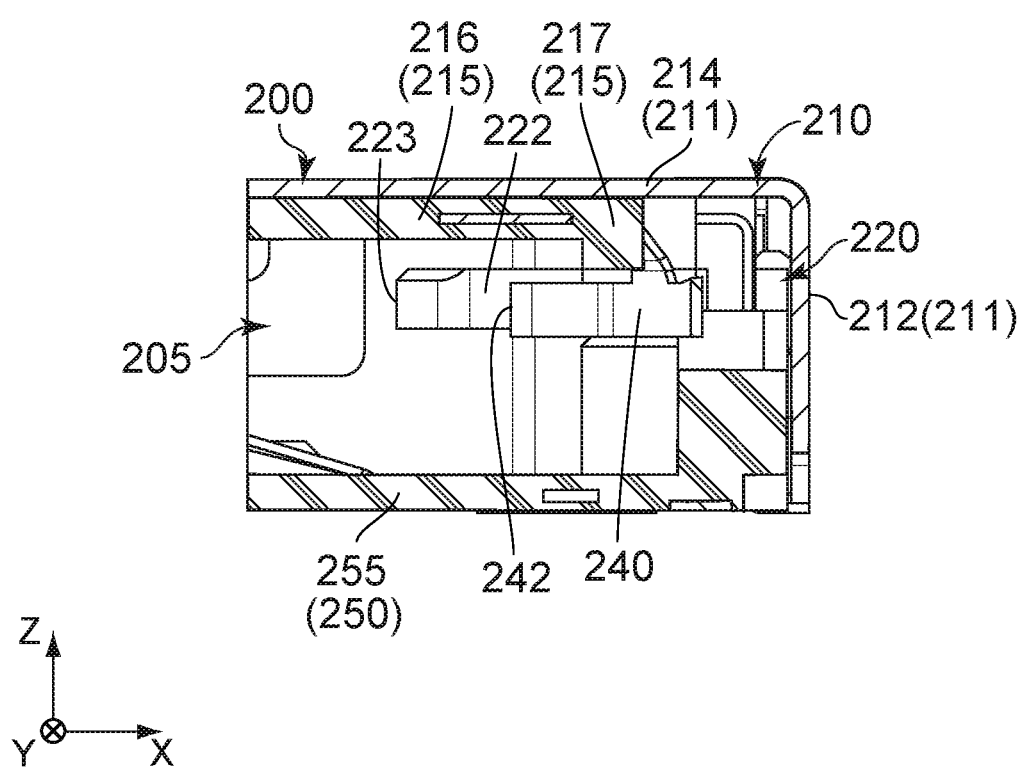
FIG. 13 is a partial, cross-sectional view showing the card connector of FIG. 11, taken along line F-F.

As shown in FIG. 12, the first member 210 of the present embodiment is positioned above the second member 250 in an up-down direction. In the present embodiment, the up-down direction is a Z-direction. Specifically, upward is a positive Z-direction, and downward is a negative Z-direction.

Figure 15:
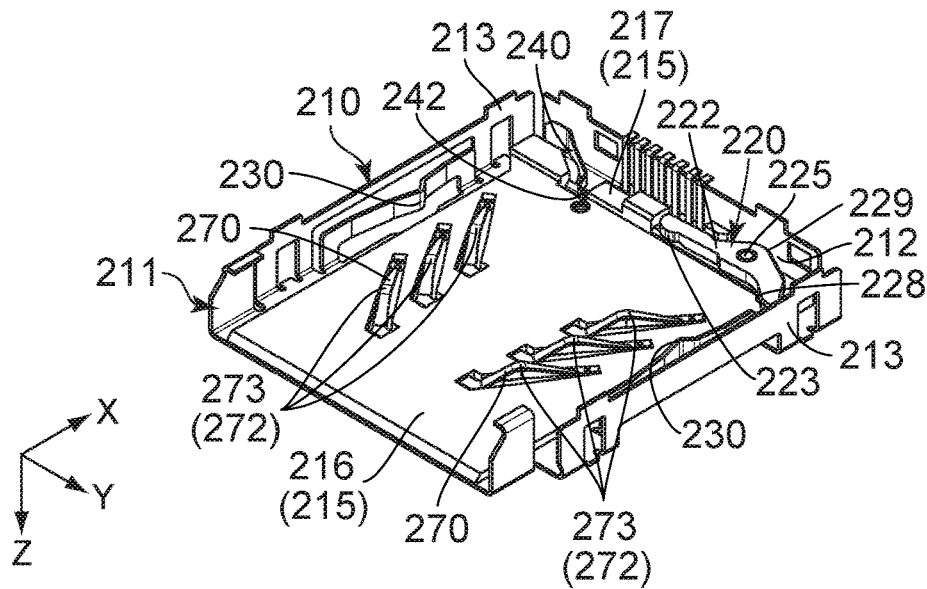
FIG. 15 is a perspective view showing a first member which is included in the card connector of FIG. 14.

As shown in FIG. 15, the first member 210 of the present embodiment has a first housing 215, a first shell 211, an ejection mechanism 220 and a detection switch 240.

Figure 16:
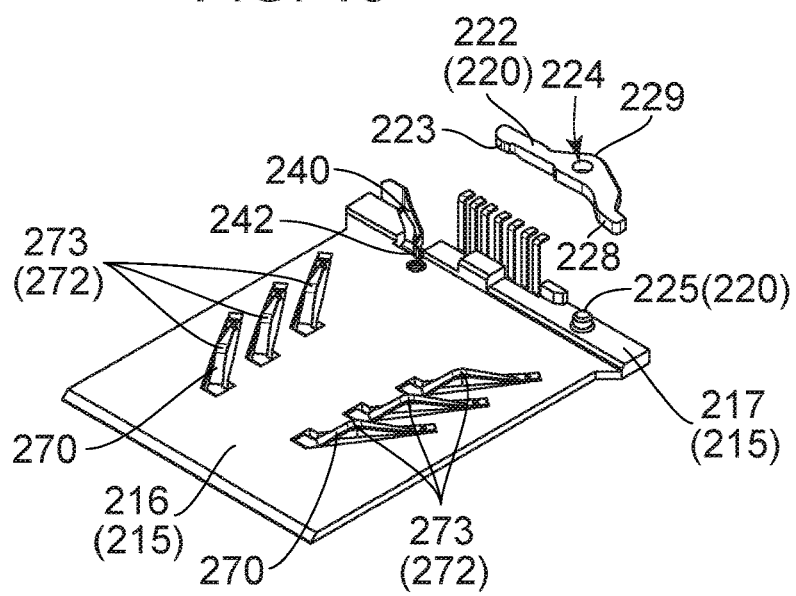
FIG. 16 is an exploded, perspective view showing the first member of FIG. 15.
Figure 16:
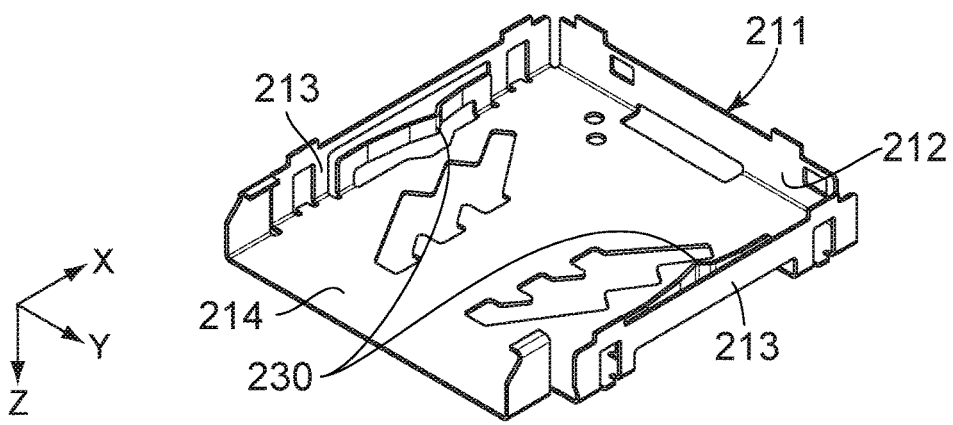

Referring to FIG. 16, the first housing 215 of the present embodiment is made of insulator. Specifically, the first housing 215 has a flat plate portion 216 and a protruding portion 217.

As shown in FIG. 16, the flat plate portion 216 of the present embodiment has a substantially plate-like shape perpendicular to the up-down direction.

As shown in FIG. 16, the protruding portion 217 of the present embodiment extends in a width direction perpendicular to both the front-rear direction and the up-down direction. In the present embodiment, the width direction is a Y-direction. The protruding portion 217 protrudes downward in the up-down direction from the flat plate portion 216. Specifically, a lower end of the protruding portion 217 is positioned below a lower end of the flat plate portion 216. The protruding portion 217 defines a front end of the first housing 215.

Referring to FIG. 16, the first shell 211 of the present embodiment is made of metal. Specifically, the first shell 211 has a ceiling portion 214, a front wall 212, two side walls 213. In other words, the connector main 200 has the front wall 212.

As shown in FIG. 16, the ceiling portion 214 of the present embodiment has a substantially plate-like shape perpendicular to the up-down direction. The ceiling portion 214 defines an upper end of the first shell 211. The ceiling portion 214 is positioned above the flat plate portion 216 of the first housing 215 in the up-down direction.

As shown in FIG. 16, the front wall 212 of the present embodiment has a substantially plate-like shape perpendicular to the front-rear direction. The front wall 212 extends downward from a front end of the ceiling portion 214. The front wall 212 defines a front end of the first shell 211.

As shown in FIG. 16, the side walls 213 of the present embodiment extend downward in the up-down direction from opposite ends, respectively, of the ceiling portion 214 in the width direction. Each of the side walls 213 defines an outer end of the first shell 211 in the width direction.

As shown in FIG. 16, each of the side walls 213 of the present embodiment has a holding spring 230. In other words, the connector main 200 is provided with the holding springs 230.

As shown in FIG. 16, each of the holding springs 230 of the present embodiment protrudes inward in the width direction. Each of the holding springs 230 is resiliently deformable in the width direction.

Figure 3:
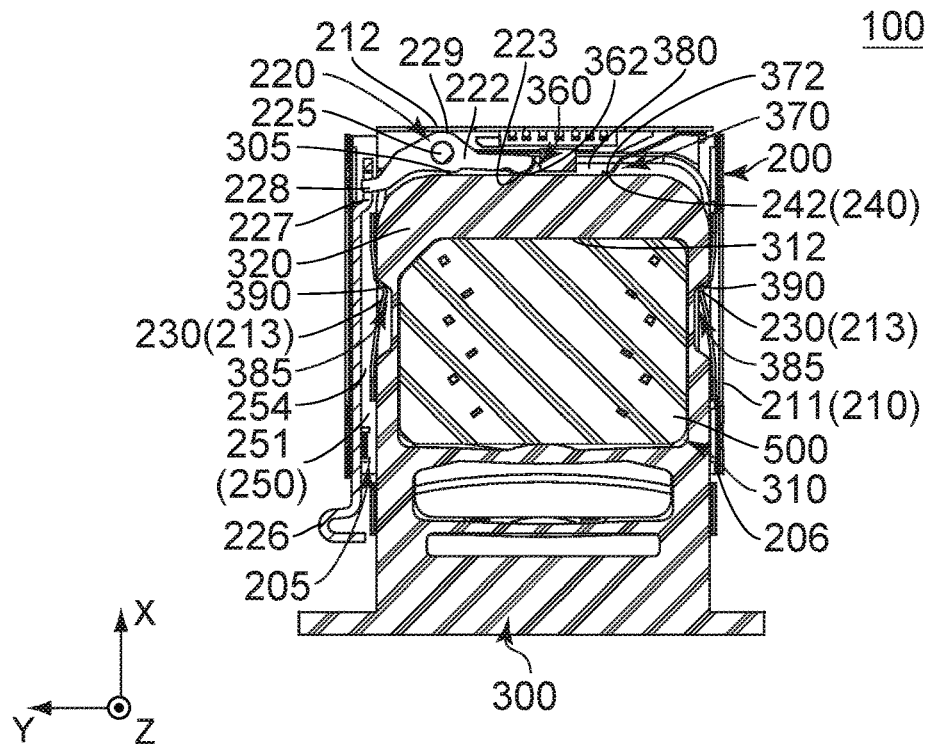
FIG. 3 is a cross-sectional view showing the card connector of FIG. 2, taken along line A-A.
Figure 4:
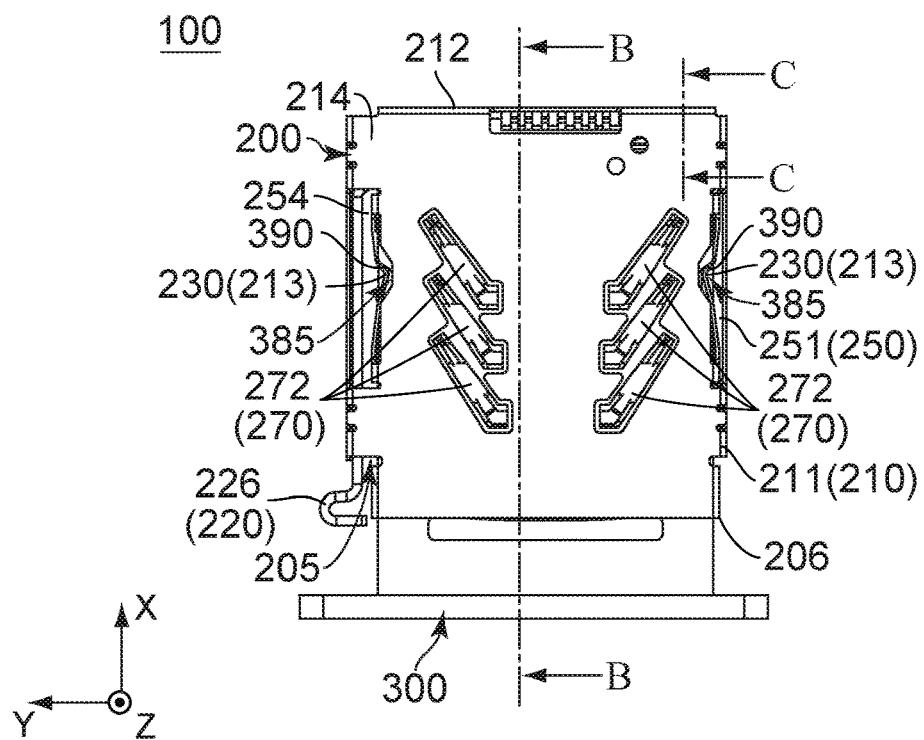
FIG. 4 is a top view showing the card connector of FIG. 1.
Figure 9:
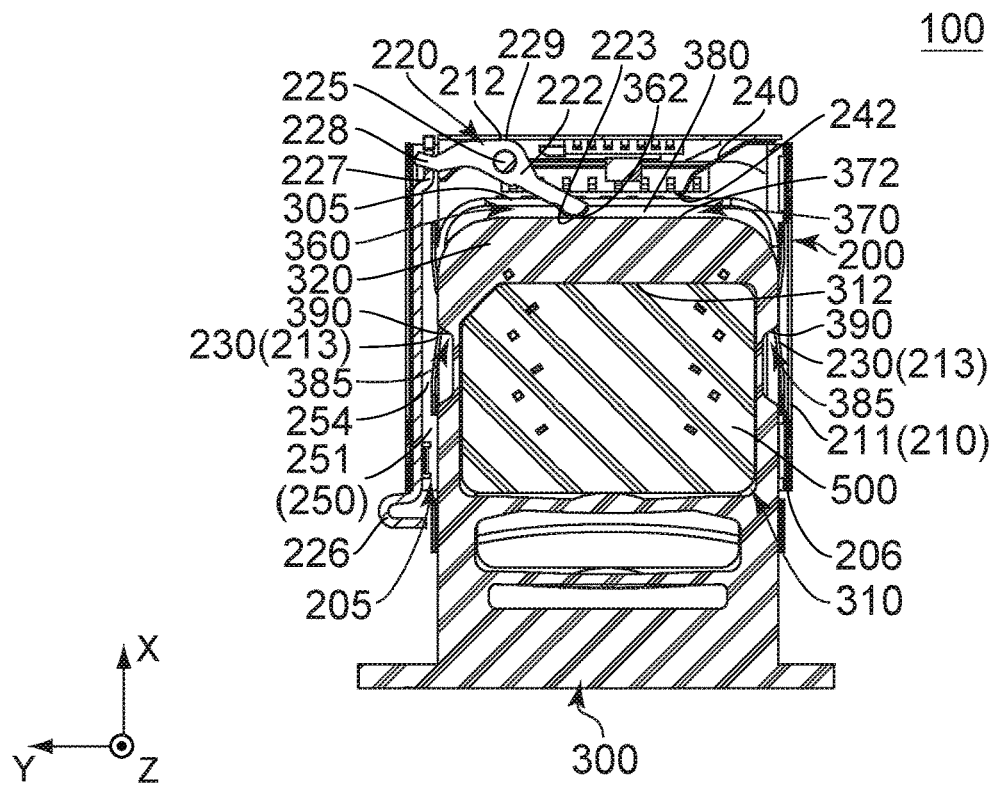
FIG. 9 is a cross-sectional view showing the card connector of FIG. 8, taken along line D-D.

Referring to FIGS. 3 and 9, the ejection mechanism 220 of the present embodiment is a mechanism for ejecting the tray 300 from the connector main 200 under a received state where the tray 300 is received in the connector main 200. Specifically, the connector main 200 is provided with the ejection mechanism 220 for ejecting the tray 300.

As shown in FIG. 15, the ejection mechanism 220 of the present embodiment has an axis portion 225 and an eject lever 222. Specifically, the axis portion 225 is provided on the first member 210.

As shown in FIG. 16, the axis portion 225 of the present embodiment protrudes downward from the protruding portion 217 of the first housing 215. The axis portion 225 has a substantially cylindrical shape which has a center axis parallel to the up-down direction.

As shown in FIG. 16, the eject lever 222 of the present embodiment has a push portion 223, an axis hole 224, a pressed portion 229 and an engaged portion 228. In other words, the push portion 223 is provided on the eject lever 222. As shown in FIG. 15, the eject lever 222 is supported by the axis portion 225. The eject lever 222 is movable about the axis portion 225 as a fulcrum. More specifically, the eject lever 222 is rotatable in a plane perpendicular to the up-down direction about the axis portion 225 as the fulcrum.

As shown in FIG. 16, the push portion 223 of the present embodiment is positioned in the vicinity of an inner end of the eject lever 222 in the width direction. The push portion 223 pushes the tray 300 upon the ejection of the tray 300.

As shown in FIG. 16, the axis hole 224 of the present embodiment pierces the eject lever 222 in the up-down direction. The axis hole 224 is positioned between the push portion 223 and the engaged portion 228 in the width direction. More specifically, in the width direction, the axis hole 224 is positioned outward of the push portion 223 when viewed from a middle of the first member 210. Additionally, in the width direction, the axis hole 224 is positioned inward of the engaged portion 228 when viewed from the middle of the first member 210. The axis hole 224 has a cylindrical shape which has a center axis parallel to the up-down direction. The axis portion 225 is inserted into the axis hole 224.

As shown in FIG. 16, the pressed portion 229 of the present embodiment is positioned forward beyond the axis hole 224 in the front-rear direction. The pressed portion 229 is positioned between the push portion 223 and the engaged portion 228 in the width direction. More specifically, in the width direction, the pressed portion 229 is positioned outward of the push portion 223 when viewed from the middle of the first member 210. Additionally, in the width direction, the pressed portion 229 is positioned inward of the engaged portion 228 when viewed from the middle of the first member 210.

As shown in FIG. 15, the engaged portion 228 of the present embodiment is positioned in the vicinity of an outer end of the eject lever 222 in the width direction.

As shown in FIG. 14, the ejection mechanism 220 of the present embodiment further comprises an eject bar 226. The eject bar 226 extends in the front-rear direction. The eject bar 226 has an engaging portion 227 which is positioned around its front end. The eject bar 226 is movable in the front-rear direction. As shown in FIG. 3, the engaging portion 227 of the eject bar 226 is engaged with the engaged portion 228 of the eject lever 222. Referring to FIGS. 3 and 9, when the eject bar 226 is moved in the front-rear direction, the eject lever 222 is rotated about the axis portion 225 as the fulcrum. More specifically, when the eject bar 226 in a state shown in FIG. 3 is moved forward, the engaged portion 228 of the eject lever 222 is moved forward while the push portion 223 of the eject lever 222 is moved rearward. When the eject bar 226 in a state shown in FIG. 9 is moved rearward, the engaged portion 228 of the eject lever 222 is moved rearward while the push portion 223 of the eject lever 222 is moved forward.

Referring to FIGS. 3 and 9, the detection switch 240 of the present embodiment is for detecting the received state where the tray 300 is received in the connector main 200. Specifically, the connector main 200 further comprises the detection switch 240 for detecting the received state where the tray 300 is received in the connector main 200.

Referring to FIG. 15, the detection switch 240 of the present embodiment extends rearward in the front-rear direction and inward in the width direction from the protruding portion 217 of the first housing 215. An outer end of the detection switch 240 in the width direction is fixed to the protruding portion 217 of the first housing 215. A rear end of the detection switch 240, which is positioned at its inner end in the width direction, is a free end. The detection switch 240 is spaced apart from the ejection mechanism 220 in the width direction. The detection switch 240 of the present embodiment is a normally closed switch. However, the present invention is not limited thereto. The detection switch 240 may be a normally open switch.

As shown in FIG. 15, the detection switch 240 of the present embodiment comprises an operated portion 242. The operated portion 242 is provided on the free end of the detection switch 240.

As shown in FIG. 14, the second member 250 of the present embodiment has a second housing 255 and a second shell 251.

Referring to FIG. 14, the second housing 255 of the present embodiment is made of insulator. Specifically, the second housing 255 has a substantially plate-like shape perpendicular to the up-down direction. As shown in FIG. 12, the second housing 255 is positioned below the first housing 215 of the first member 210 in the up-down direction.

Referring to FIG. 14, the second shell 251 of the present embodiment is made of metal. Specifically, the second shell 251 has a bottom portion 254 and side walls 253.

Referring to FIG. 14, the bottom portion 254 of the present embodiment has a substantially plate-like shape perpendicular to the up-down direction. The bottom portion 254 defines a lower end of the second shell 251. The bottom portion 254 is positioned below the second housing 255 in the up-down direction.

As shown in FIG. 14, the side walls 253 of the present embodiment extend upward from opposite ends, respectively, of the bottom portion 254 in the width direction.

As shown in FIG. 12, the first member 210 and the second member 250 of the present embodiment form a tray receiving portion 205.

As shown in FIG. 12, the tray receiving portion 205 of the present embodiment is a space extending in the front-rear direction. The tray receiving portion 205 has an opening 206 at its rear end. The tray receiving portion 205 is opened at its rear end and is closed at its front end. The tray receiving portion 205 is the space which receives the tray 300 when the tray 300 is inserted into the connector main 200 through the opening 206. The opening 206 is positioned at the rear end of the connector main 200 in the front-rear direction.

As shown in FIG. 14, the terminals 270 of the present embodiment include a plurality of first terminals 272 and a plurality of second terminals 275.

Referring to FIG. 16, each of the first terminals 272 of the present embodiment is made of metal. Specifically, each of the first terminals 272 has a first contact portion 273. Each of the first terminals 272 is held by the flat plate portion 216 of the first housing 215 of the first member 210. As shown in FIG. 12, the first contact portion 273 is positioned below the lower end of the flat plate portion 216 of the first housing 215 of the first member 210.

Referring to FIG. 14, each of the second terminals 275 is made of metal. Specifically, each of the second terminals 275 has a second contact portion 276. Each of the second terminals 275 is held by the second housing 255 of the second member 250. As shown in FIG. 12, the second contact portion 276 is positioned above an upper end of the second housing 255 of the second member 250.

Figure 18:
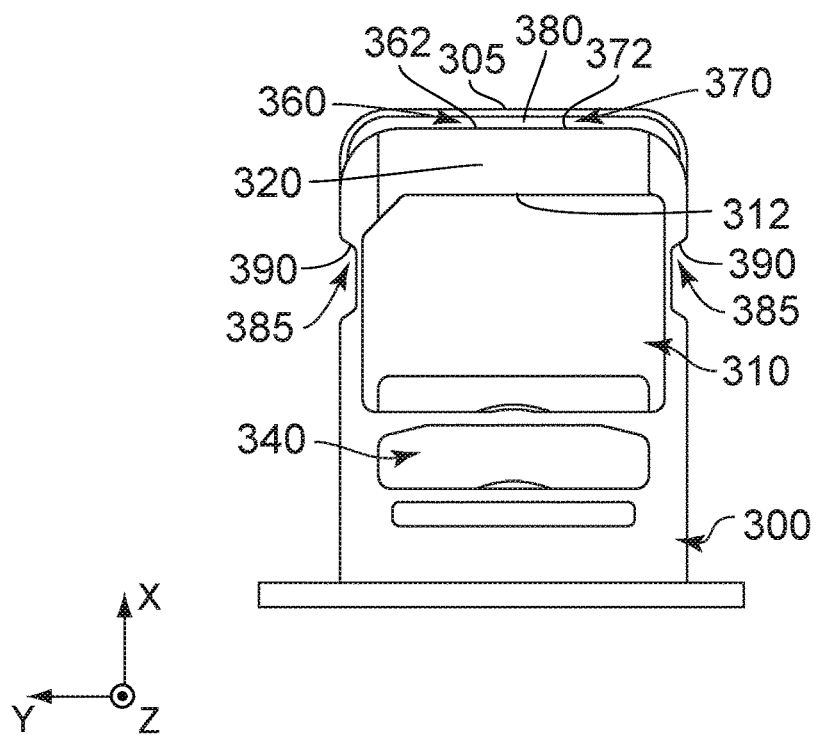
FIG. 18 is a top view showing the tray of FIG. 17.
Figure 19:
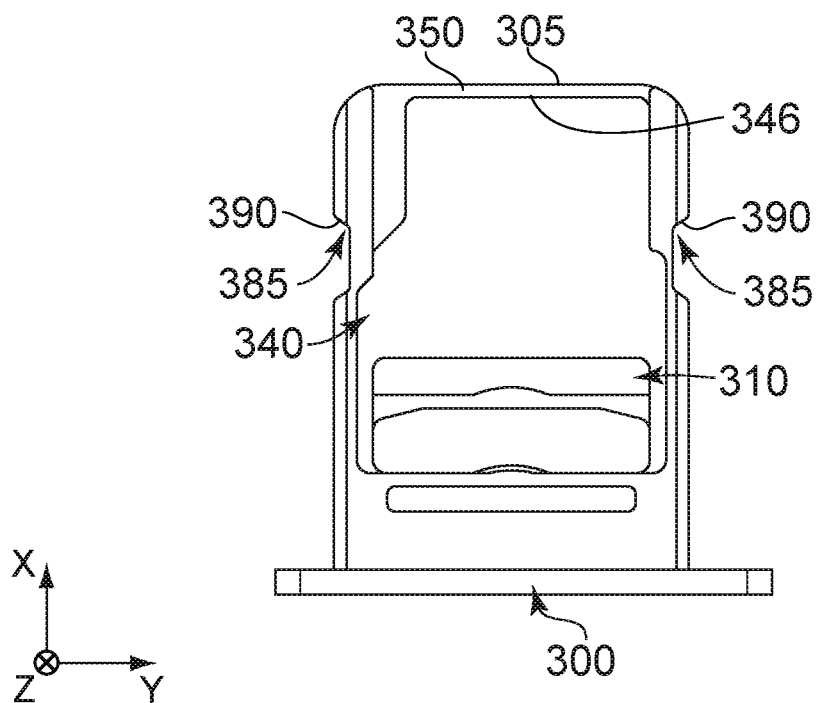
FIG. 19 is a bottom view showing the tray of FIG. 17.

Referring to FIGS. 18 and 19, the tray 300 of the present embodiment is made of resin. Specifically, the tray 300 of the present embodiment has a first card accommodation portion 310, a second card accommodation portion 340, a first thicker portion 320, a second thicker portion 350, a mechanism accommodation portion 360, a partition 380 and two recesses 385.

Figure 10:
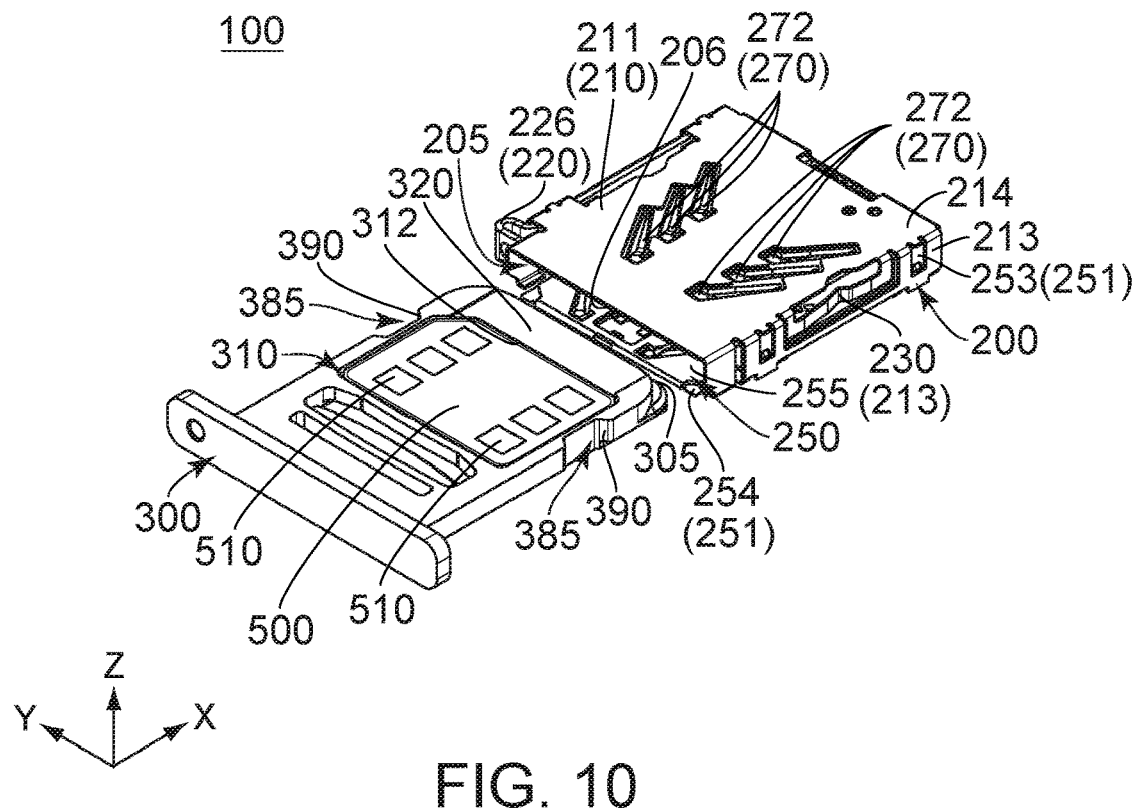
FIG. 10 is yet another perspective view showing the card connector of FIG. 1. In the figure, the card connector is in a pulled-out state where the tray is pulled out from the connector main.
Figure 11:
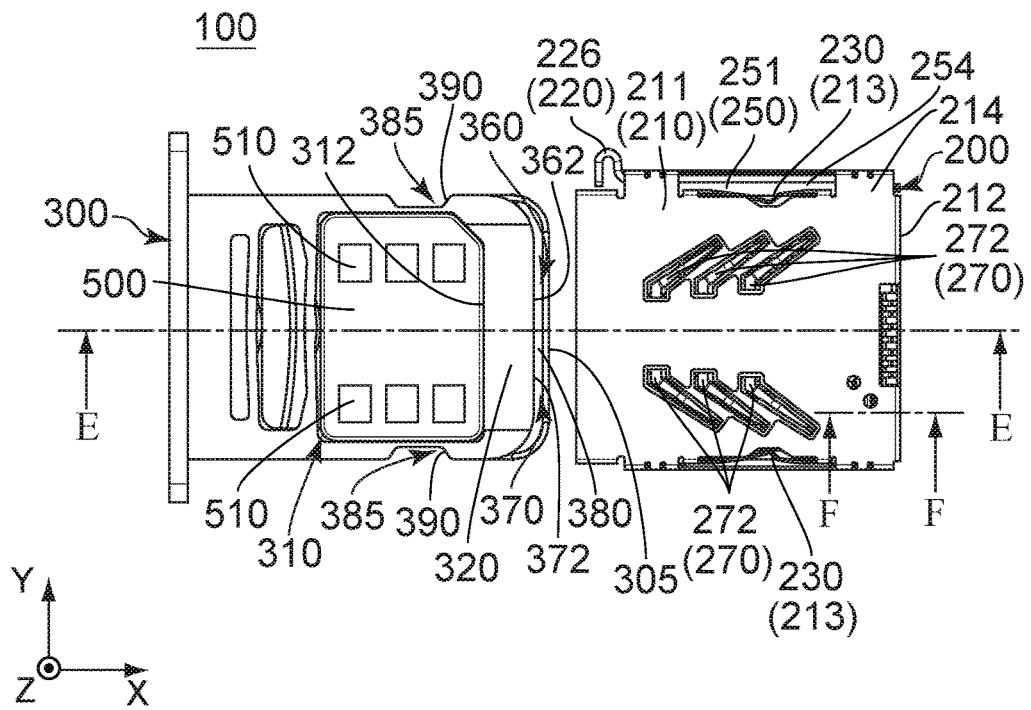
FIG. 11 is a top view showing the card connector of FIG. 10.

As shown in FIG. 10, the first card accommodation portion 310 of the present embodiment is configured to accommodate a first card (card) 500.

As shown in FIG. 10, the first card 500 of the present embodiment is a nano SIM (Subscribed Identity Module) card 500 which has a plurality of pads 510. Referring to FIGS. 5 and 12, under a received state where the tray 300, which accommodates the first card 500, is received in the connector main 200, the pads 510 of the first card 500 are connected with the first contact portions 273 of the first terminals 272, respectively, of the terminals 270 of the connector main 200.

Figure 17:
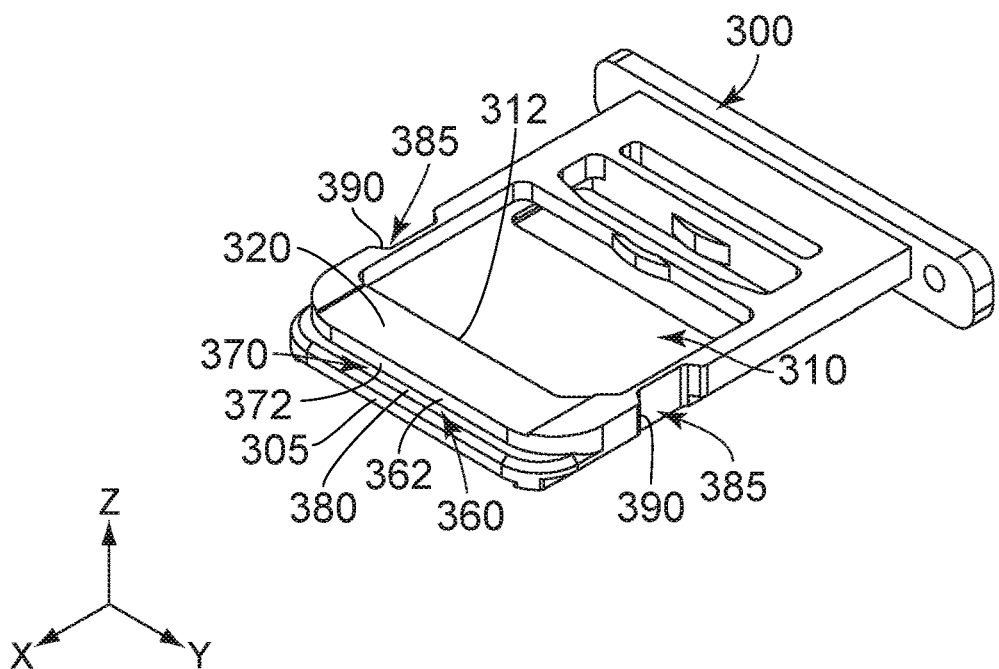
FIG. 17 is a perspective view showing the tray which is included in the card connector of FIG. 14.

As shown in FIG. 17, the first card accommodation portion 310 of the present embodiment is opened upward in the up-down direction. As shown in FIG. 12, the first card accommodation portion 310 is positioned above the second card accommodation portion 340 in the up-down direction perpendicular to the front-rear direction. However, the present invention is not limited thereto. The first card accommodation portion 310 may be positioned below the second card accommodation portion 340 in the up-down direction.

As shown in FIG. 12, a front end 312 of the first card accommodation portion 310 is positioned rearward of a front end 346 of the second card accommodation portion 340 in the front-rear direction.

As shown in FIG. 12, the second card accommodation portion 340 of the present embodiment is configured to receive a second card (card) 600.

Referring to FIG. 14, the second card 600 of the present embodiment is a micro SD (Secure Digital) card 600. Under a received state where the tray 300, which accommodates the second card 600, is received in the connector main 200, pads (not shown) of the second card 600 are connected with the second contact portions 276 of the second terminals 275, respectively, of the terminals 270 of the connector main 200.

Figure 6:
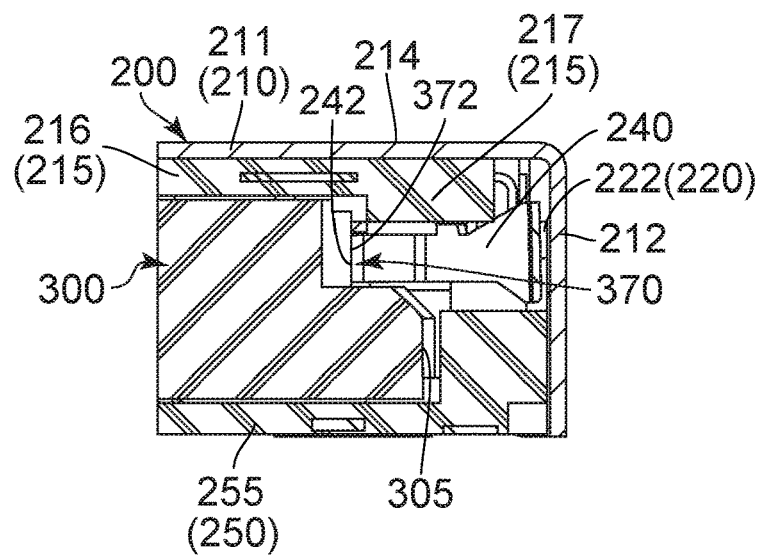
FIG. 6 is a partial, cross-sectional view showing the card connector of FIG. 4, taken along line C-C.
Figure 7:
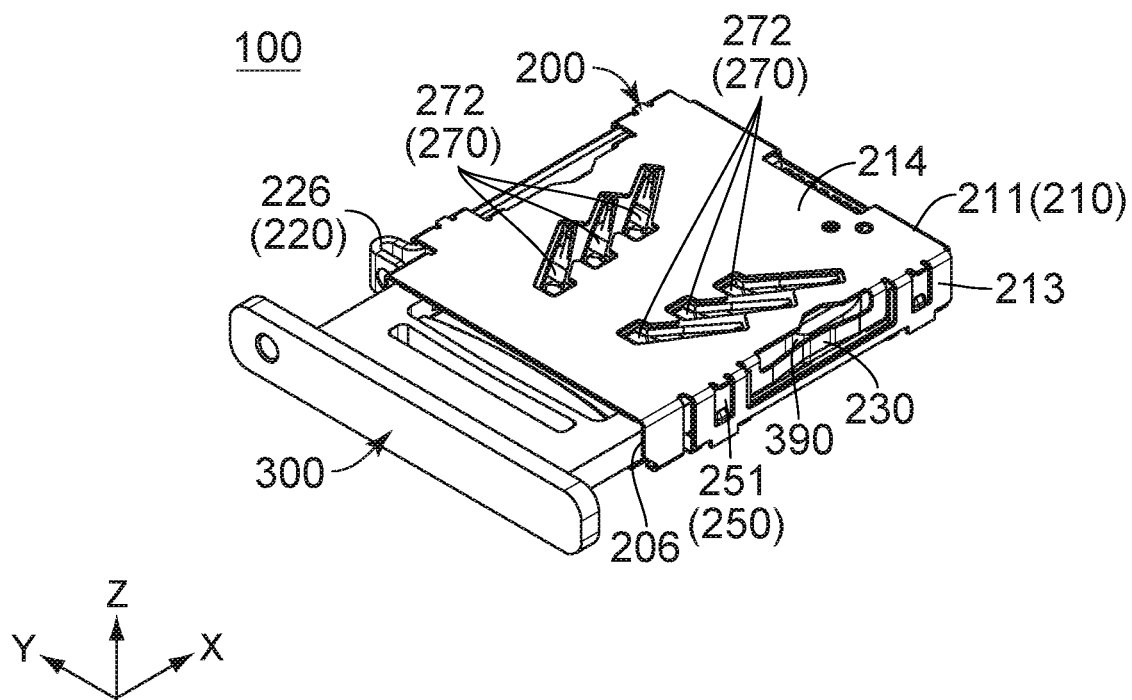
FIG. 7 is another perspective view showing the card connector of FIG. 1. In the figure, the card connector is in an ejected state where the tray is ejected from the connector main.
Figure 8:
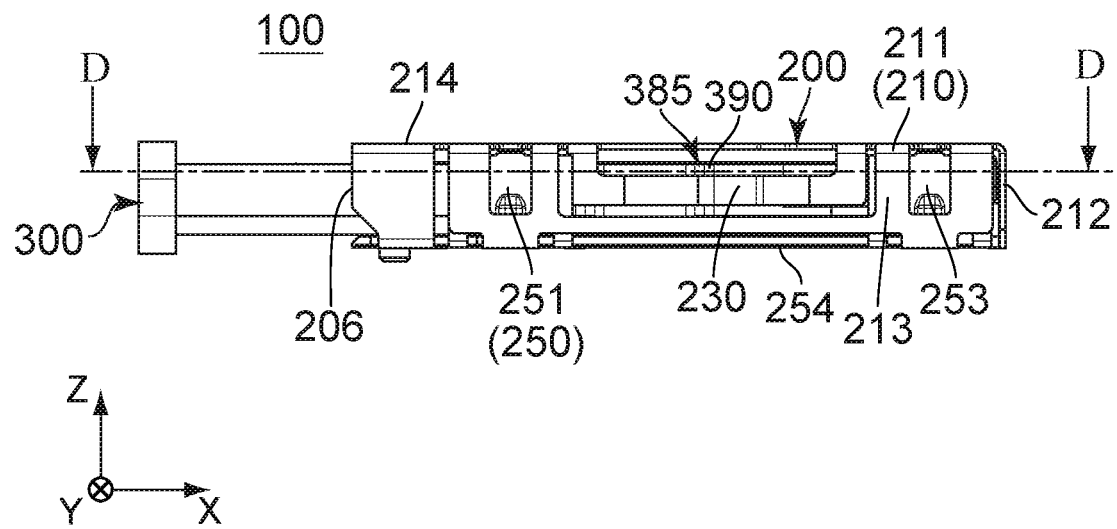
FIG. 8 is a side view showing the card connector of FIG. 7.

Referring to FIG. 12, the second card accommodation portion 340 of the present embodiment is opened downward in the up-down direction. The second card accommodation portion 340 is positioned below the first card accommodation portion 310 in the up-down direction. Referring to FIGS. 5 and 6, the detection switch 240 of the first member 210 of the connector main 200 is entirely positioned above the second card accommodation portion 340 in the up-down direction under the received state where the tray 300 is received in the connector main 200.

Referring to FIG. 12, the first thicker portion 320 of the present embodiment is made of only resin. The first thicker portion 320 is positioned above the second thicker portion 350 in the up-down direction. The first thicker portion 320 is positioned between the mechanism accommodation portion 360 and the first card accommodation portion 310 in the front-rear direction. More specifically, the first thicker portion 320 is positioned rearward of the mechanism accommodation portion 360 in the front-rear direction. Additionally, the first thicker portion 320 is positioned forward of the first card accommodation portion 310 in the front-rear direction. The first thicker portion 320 is positioned rearward of the partition 380 in the front-rear direction.

Referring to FIG. 12, the second thicker portion 350 of the present embodiment is made of only resin. The second thicker portion 350 is positioned between a forwardmost end 305 of the tray 300 and the second card accommodation portion 340 in the front-rear direction. More specifically, the second thicker portion 350 is positioned rearward of the forwardmost end 305 of the tray 300 in the front-rear direction. Additionally, the second thicker portion 350 is positioned forward of the second card accommodation portion 340 in the front-rear direction. The second thicker portion 350 is positioned forward of the partition 380 in the front-rear direction. A dimension S2 of the second thicker portion 350 in the front-rear direction is smaller than a dimension S1 of the first thicker portion 320 in the front-rear direction. In other words, in the front-rear direction, the first thicker portion 320 has the dimension S1 greater than the dimension S2 of the second thicker portion 350.

As shown in FIG. 17, the mechanism accommodation portion 360 of the present embodiment is opened forward in the front-rear direction. More specifically, the mechanism accommodation portion 360 is opened forward in the front-rear direction and upward in the up-down direction. As shown in FIG. 12, the mechanism accommodation portion 360 of the present embodiment is positioned above the second card accommodation portion 340 in the up-down direction perpendicular to the front-rear direction. The mechanism accommodation portion 360 is positioned forward of the first card accommodation portion 310 in the front-rear direction. A position of the mechanism accommodation portion 360 and a position of the second card accommodation portion 340 overlap with each other in the front-rear direction. Accordingly, the card connector 100 can have a reduced dimension in the front-rear direction.

As shown in FIG. 5, under the received state where the tray 300 is received in the connector main 200, the mechanism accommodation portion 360 accommodates both the push portion 223 and the eject lever 222. Specifically, under the received state where the tray 300 is received in the connector main 200, the eject lever 222 is partially accommodated in the mechanism accommodation portion 360. However, the present invention is not limited thereto. It is sufficient that the mechanism accommodation portion 360 accommodates at least the push portion 223 under the received state where the tray 300 is received in the connector main 200.

As shown in FIG. 17, the mechanism accommodation portion 360 of the present embodiment is provided with a pushed portion 362. The pushed portion 362 faces forward in the front-rear direction. The pushed portion 362 of the present embodiment is a part of a front end of the first thicker portion 320. Referring to FIGS. 3 and 9, when the push portion 223 of the eject lever 222 pushes the pushed portion 362 of the mechanism accommodation portion 360, the tray 300 is ejected from the connector main 200.

As described above, the pushed portion 362 of the mechanism accommodation portion 360 is the part of the front end of the first thicker portion 320 which is made of only resin. Additionally, in the front-rear direction, the first thicker portion 320 has the dimension S1 greater than the dimension S2 of the second thicker portion 350 as described above. Accordingly, the pushed portion 362 of the mechanism accommodation portion 360 of the tray 300, which is pushed by the push portion 223 of the eject lever 222, has a sufficient strength. However, the present invention is not limited thereto. The strength of the first thicker portion 320 may be improved by embedding a metal member into the first thicker portion 320.

As shown in FIG. 17, the partition 380 of the present embodiment has a plate-like shape perpendicular to the up-down direction. The partition 380 extends in the width direction. Since the tray 300 of the present embodiment has the partition 380, resin can flow more smoothly upon molding of the tray 300 in comparison with an assumption where the tray 300 have no partition 380. Thus, the tray 300 of the present embodiment has excellent formability.

As shown in FIG. 12, the partition 380 of the present embodiment is positioned forward of the first card accommodation portion 310 in the front-rear direction. The partition 380 is positioned between the first card accommodation portion 310 and the second card accommodation portion 340 in the up-down direction. More specifically, the partition 380 is positioned below the first card accommodation portion 310 in the up-down direction. Additionally, the partition 380 is positioned above the second card accommodation portion 340 in the up-down direction.

As shown in FIG. 12, the partition 380 of the present embodiment is positioned between the mechanism accommodation portion 360 and the second card accommodation portion 340 in the up-down direction. More specifically, the partition 380 is positioned below the mechanism accommodation portion 360 in the up-down direction. Additionally, the partition 380 is positioned above the second card accommodation portion 340 in the up-down direction. The partition 380 of the present embodiment separates the mechanism accommodation portion 360 and the second card accommodation portion 340 from each other in the up-down direction. In other words, the mechanism accommodation portion 360 and the second card accommodation portion 340 do not communicate with each other in the up-down direction.

As shown in FIG. 5, under the received state where the tray 300 is received in the connector main 200, the partition 380 of the present embodiment faces a lower end of the push portion 223 of the eject lever 222 of the ejection mechanism 220 of the first member 210 of the connector main 200 in the up-down direction. Referring to FIGS. 5 and 6, under the received state where the tray 300 is received in the connector main 200, the partition 380 of the present embodiment faces a lower end of the operated portion 242 of the detection switch 240 of the first member 210 of the connector main 200 in the up-down direction.

As shown in FIG. 18, each of the recesses 385 of the present embodiment is recessed inward in the width direction. The recesses 385 are positioned at opposite ends, respectively, of the tray 300 in the width direction. As shown in FIG. 14, each of the recesses 385 has a plane 390 which faces rearward in the front-rear direction and outward in the width direction. The plane 390 functions as a held portion 390. In other words, the tray 300 of the present embodiment is provided with the held portions 390.

As shown in FIG. 18, the held portion 390 of the present embodiment is oblique to both the front-rear direction and the width direction. Referring to FIG. 3, under the received state where the tray 300 is received in the connector main 200, the held portions 390 receive at least forward forces from the holding springs 230, respectively.

As shown in FIG. 17, the tray 300 of the present embodiment is provided with a switch accommodation portion 370 and a switch operation portion 372.

Figure 20:
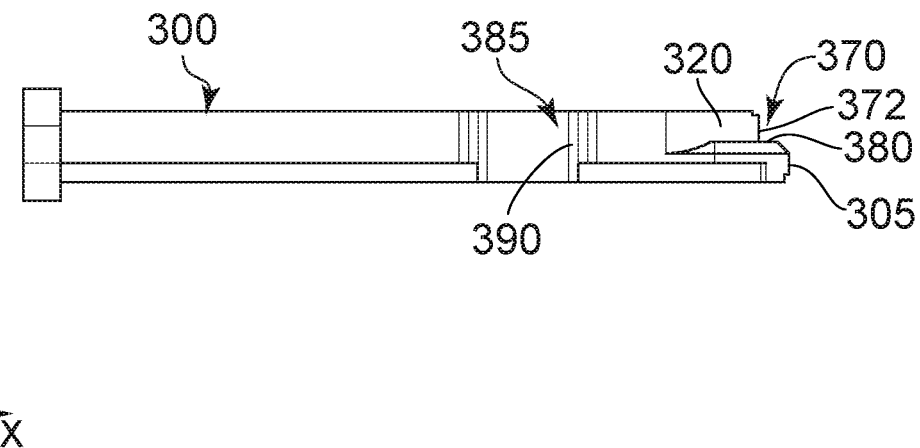
FIG. 20 is a side view showing the tray of FIG. 17.
Figure 21:
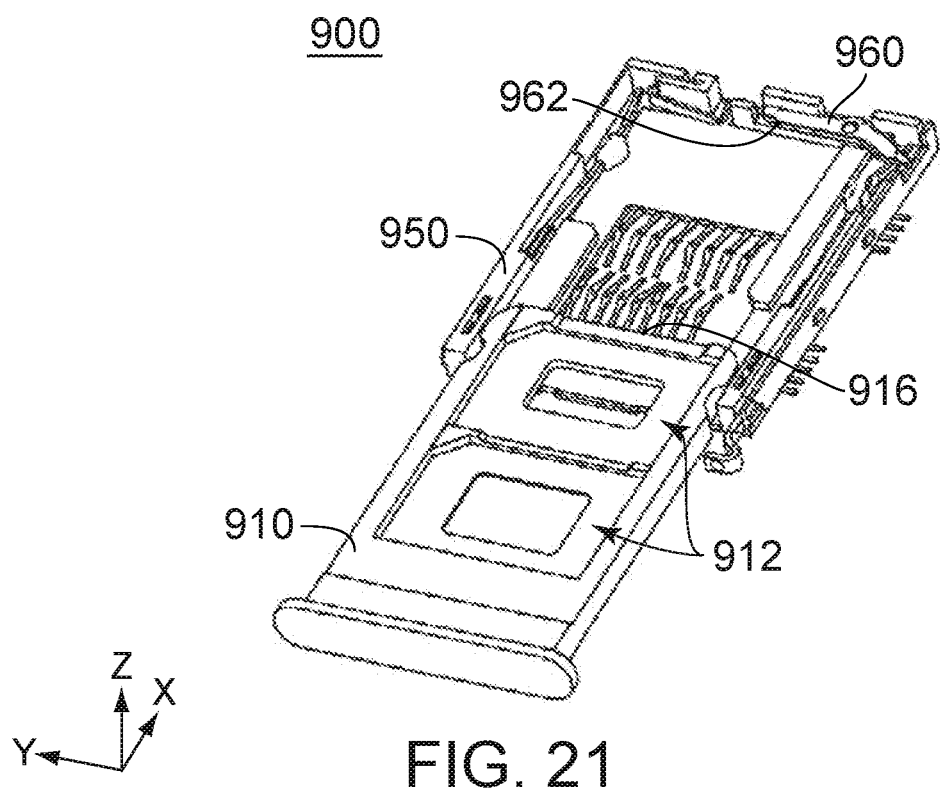
FIG. 21 is a perspective view showing a part of a card connector of Patent Document 1.
Figure 22:
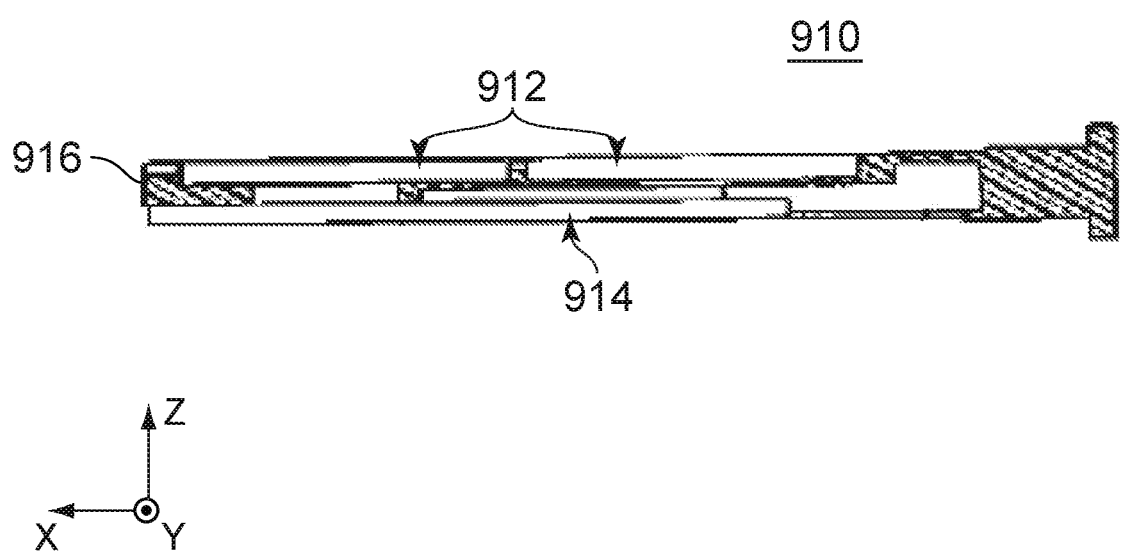
FIG. 22 is a cross-sectional view showing a tray which is included in the card connector of FIG. 21.

As shown in FIG. 17, the switch accommodation portion 370 of the present embodiment is opened forward in the front-rear direction. More specifically, the switch accommodation portion 370 is opened forward in the front-rear direction and upward in the up-down direction. Referring to FIGS. 12 and 20, the switch accommodation portion 370 of the present embodiment is positioned above the second card accommodation portion 340 in the up-down direction. Additionally, the switch accommodation portion 370 of the present embodiment is positioned forward of the first card accommodation portion 310 in the front-rear direction. As shown in FIG. 18, the tray 300 of the present embodiment has a structure that the switch accommodation portion 370 and the mechanism accommodation portion 360 are continuous with each other in the width direction. However, the present invention is not limited thereto. The switch accommodation portion 370 and the mechanism accommodation portion 360 may not be continuous with each other in the width direction.

As shown in FIG. 17, the switch operation portion 372 of the present embodiment is positioned in the switch accommodation portion 370. The switch operation portion 372 of the present embodiment is a part of the front end of the first thicker portion 320. As shown in FIG. 18, the switch operation portion 372 is spaced apart from the pushed portion 362 of the mechanism accommodation portion 360 in the width direction.

As shown in FIG. 6, under the received state where the tray 300 is received in the connector main 200, the detection switch 240 is, at least in part, accommodated in the switch accommodation portion 370 while the switch operation portion 372 pushes the operated portion 242 of the detection switch 240 to operate the detection switch 240.

Movements and states of the components of the connector main 200 and the tray 300 when the connector main 200 receives the tray 300 are described in detail hereinafter.

First, referring to FIG. 12, the connector main 200 and the tray 300 are positioned so that the forwardmost end 305 of the tray 300 faces the opening 206 of the tray receiving portion 205 of the connector main 200 in the front-rear direction.

Next, the tray 300 is moved forward relative to the connector main 200. Thus, as shown in FIGS. 3 and 5, the connector main 200 and the tray 300 are in the received state where the tray 300 is received in the tray receiving portion 205 of the connector main 200.

Meanwhile, referring to FIG. 5, the mechanism accommodation portion 360 of the tray 300 accommodates both the push portion 223 and the eject lever 222 of the first member 210 of the connector main 200. Specifically, the eject lever 222 of the first member 210 of the connector main 200 is partially accommodated in the mechanism accommodation portion 360 of the tray 300 under the received state. Additionally, under the received state, the pushed portion 362 of the mechanism accommodation portion 360 of the tray 300 is in contact with the push portion 223 of the eject lever 222 of the first member 210 of the connector main 200 in the front-rear direction.

Also meanwhile, referring to FIG. 6, the detection switch 240 of the first member 210 of the connector main 200 is, at least in part, accommodated in the switch accommodation portion 370 of the tray 300 while the switch operation portion 372 of the switch accommodation portion 370 of the tray 300 pushes the operated portion 242 of the detection switch 240 of the first member 210 of the connector main 200 to operate the detection switch 240. Accordingly, the detection switch 240 of the first member 210 of the connector main 200 can detect the received state where the tray 300 is received in the connector main 200.

Further, referring to FIG. 3, the held portions 390 of the recesses 385 of the tray 300 are in contact with the holding springs 230 of the side walls 213, respectively, of the first shell 211 of the first member 210 of the connector main 200 in the front-rear direction at that time. More specifically, the held portion 390 of each of the recesses 385 of the tray 300 receives at least the forward force from the holding spring 230 of the corresponding side wall 213 of the first shell 211 of the first member 210 of the connector main 200 at that time. Accordingly, if the eject lever 222 is unoperated under the received state where the tray 300 is received in the connector main 200, the tray 300 is prevented from being ejected rearward from the tray receiving portion 205 of the connector main 200. In other words, the received state, where the tray 300 is received in the tray receiving portion 205 of the connector main 200, is maintained in this case.

Movements and states of the components of the connector main 200 and the tray 300 upon the ejection of the tray 300 from the connector main 200 are described in detail hereinafter.

First, referring to FIGS. 3 and 16, when the eject bar 226 starts to be moved forward in the front-rear direction by being pushed by a thin rod (not shown), etc. under the received state where the tray 300 is received in the connector main 200, the axis hole 224 of the eject lever 222 is pressed against the axis portion 225 while the pressed portion 229 of the eject lever 222 is pressed against the front wall 212 of the first shell 211. In other words, when the eject bar 226 starts to be moved forward under the received state where the tray 300 is received in the connector main 200, the eject lever 222 is pressed against the front wall 212. Accordingly, the forward movement of the eject bar 226 applies a forward force to the eject lever 222, and the forward force is dispersed to the axis portion 225 of the ejection mechanism 220 and the front wall 212 of the first shell 211. Specifically, the front wall 212 functions to reinforce the axis portion 225.

The forward movement of the eject bar 226 causes the engaging portion 227 of the eject bar 226 to apply a forward force to the engaged portion 228 of the eject lever 222. Accordingly, a rotational moment is produced about the axis portion 225 of the eject lever 222, so that a rearward force is applied to the push portion 223 of the eject lever 222.

Meanwhile, the pushed portion 362 of the mechanism accommodation portion 360 of the tray 300 is pushed rearward by the push portion 223 of the eject lever 222 of the first member 210 of the connector main 200.

In other words, when the eject bar 226 is moved forward in the front-rear direction under the received state where the tray 300 is received in the connector main 200, the eject lever 222 is moved about the axis portion 225 as the fulcrum so that the push portion 223 pushes the pushed portion 362.

When the pushed portion 362 of the mechanism accommodation portion 360 of the tray 300 is pushed rearward by the push portion 223 of the eject lever 222 of the first member 210 of the connector main 200, the held portion 390 of each of the recesses 385 of the tray 300 applies a force, which is directed rearward in the front-rear direction and outward in the width direction, to the holding spring 230 of the corresponding side wall 213 of the first shell 211 of the first member 210 of the connector main 200.

After that, when the eject bar 226 is further moved forward, the further forward movement increases the force applied to the holding spring 230 by the corresponding held portion 390, which is directed rearward in the front-rear direction and outward in the width direction, so that the holding spring 230 is resiliently deformed outward in the width direction. Then, the contact in the front-rear direction is broken between the held portion 390 of each of the recesses 385 of the tray 300 and the holding spring 230 of the corresponding side wall 213 of the first shell 211 of the first member 210 of the connector main 200.

When the eject bar 226 is still further moved forward under this state, the push portion 223 of the eject lever 222 of the first member 210 of the connector main 200 pushes the pushed portion 362 of the mechanism accommodation portion 360 of the tray 300 further rearward, so that the tray 300 is ejected rearward from the tray receiving portion 205 of the connector main 200 through the opening 206. In other words, the received state, where the tray 300 is received in the connector main 200, is released as shown in FIG. 9.

Although the specific explanation about the present invention is made above referring to the embodiments, the present invention is not limited thereto and is susceptible to various modifications and alternative forms.

Although the ejection mechanism 220 of the present embodiment has the axis portion 225, the eject lever 222, the push portion 223 and the eject bar 226, the present invention is not limited thereto. Specifically, the ejection mechanism 220 may not have the eject bar 226. It is sufficient that the ejection mechanism 220 has at least the push portion 223 which pushes the tray 300 upon the ejection of the tray 300. Additionally, the ejection mechanism 220 may have a push-push mechanism instead of the eject lever 222. As described above, the held portion 390 of each of the recesses 385 of the tray 300 receives at least the forward force from the holding spring 230 of the corresponding side wall 213 of the first shell 211 of the first member 210 of the connector main 200 under the received state where the tray 300 is received in the connector main 200. Accordingly, for pushing the tray 300 rearward against resistance of the holding springs 230 without upsizing the card connector 100, the eject lever 222 of the present embodiment is preferred rather than a push-push mechanism.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A card connector comprising a connector main and a tray, wherein:
   the connector main is configured to receive the tray along a front-rear direction;
   the connector main is provided with an ejection mechanism for ejecting the tray;
   the ejection mechanism has at least a push portion which pushes the tray upon ejection of the tray;
   the tray has a first card accommodation portion, a second card accommodation portion and a mechanism accommodation portion;
   each of the first card accommodation portion and the mechanism accommodation portion is positioned above the second card accommodation portion in an up-down direction perpendicular to the front-rear direction;
   the first card accommodation portion has a front end in the front-rear direction;
   the second card accommodation portion has a front end in the front-rear direction;
   the front end of the first card accommodation portion is positioned rearward of the front end of the second card accommodation portion in the front-rear direction;
   the mechanism accommodation portion is positioned forward of the first card accommodation portion in the front-rear direction;
   the mechanism accommodation portion is provided with a pushed portion;
   the mechanism accommodation portion accommodates at least the push portion under a received state where the tray is received in the connector main; and
   when the push portion pushes the pushed portion, the tray is ejected from the connector main.

2. The card connector as recited in claim 1, wherein:
   the mechanism accommodation portion is opened forward in the front-rear direction; and
   the pushed portion faces forward in the front-rear direction.

3. The card connector as recited in claim 1, wherein a position of the mechanism accommodation portion and a position of the second card accommodation portion overlap with each other in the front-rear direction.

4. The card connector as recited in claim 3, wherein:
   the tray has a partition; and
   the partition separates the mechanism accommodation portion and the second card accommodation portion from each other in the up-down direction.

5. The card connector as recited in claim 1, wherein:
   the ejection mechanism comprises at least an eject lever and an axis portion;

the eject lever is movable about the axis portion as a fulcrum;

the push portion is provided on the eject lever; and under the received state, the eject lever is partially accommodated in the mechanism accommodation portion.

6. The card connector as recited in claim 5, wherein:

the ejection mechanism further comprises an eject bar;

the eject bar is movable in the front-rear direction; and when the eject bar is moved forward in the front-rear direction under the received state, the eject lever is moved about the axis portion as the fulcrum so that the push portion pushes the pushed portion.

7. The card connector as recited in claim 6, wherein:

the connector main has a front wall; and when the eject bar starts to be moved forward under the received state, the eject lever is pressed against the front wall.

8. The card connector as recited in claim 5, wherein:

the connector main comprises a first member and a second member;

the first member is positioned above the second member in the up-down direction;

the axis portion is provided on the first member; and the eject lever is supported by the axis portion.

9. The card connector as recited in claim 5, wherein:

the tray is provided with a held portion;

the connector main is provided with a holding spring; and under the received state, the held portion receives at least a forward force from the holding spring.

10. The card connector as recited in claim 5, wherein:

the tray further has a first thicker portion and a second thicker portion;

the first thicker portion is positioned above the second thicker portion in the up-down direction;

the first thicker portion is positioned between the mechanism accommodation portion and the first card accommodation portion in the front-rear direction;

the tray has a forwardmost end in the front-rear direction;

the second thicker portion is positioned between the forwardmost end of the tray and the second card accommodation portion in the front-rear direction; and in the front-rear direction, the first thicker portion has a dimension greater than a dimension of the second thicker portion.

11. The card connector as recited in claim 1, wherein:

the tray is provided with a switch accommodation portion and a switch operation portion;

the switch operation portion is positioned in the switch accommodation portion;

the switch accommodation portion is positioned above the second card accommodation portion in the up-down direction;

the switch accommodation portion is positioned forward of the first card accommodation portion in the front-rear direction;

the connector main comprises a detection switch for detecting the received state;

the detection switch comprises an operated portion; and under the received state, the detection switch is, at least in part, accommodated in the switch accommodation portion while the switch operation portion pushes the operated portion of the detection switch to operate the detection switch.

12. The card connector as recited in claim 11, wherein the detection switch is entirely positioned above the second card accommodation portion in the up-down direction under the received state.

* * * * *